United States Patent [19]

Watanabe

[11] Patent Number: 5,107,580
[45] Date of Patent: Apr. 28, 1992

[54] METHOD OF ATTACHING SHEET FILTER TO INLET OPENING OF VENTILATION FAN OR RANGE HOOD

[75] Inventor: Kenji Watanabe, Kitakyushu, Japan

[73] Assignee: Casle Industrial Co., Ltd., Kitakyushu, Japan

[21] Appl. No.: 603,103

[22] Filed: Oct. 25, 1990

[30] Foreign Application Priority Data

Jan. 28, 1990 [JP] Japan .................................. 2-17560
Sep. 22, 1990 [JP] Japan .................................. 2-253324

[51] Int. Cl.⁵ ............................................. B01D 46/02
[52] U.S. Cl. ..................................... 29/525.1; 24/303; 55/467; 55/511; 55/DIG. 6; 55/DIG. 36; 248/206.5
[58] Field of Search .............. 55/490, 492, 501, 505, 55/511, DIG. 6, DIG. 36, 467; 160/DIG. 16; 248/206.5; 24/303; 29/525.1; 126/299 D, 299 R

[56] References Cited

U.S. PATENT DOCUMENTS

| | | | |
|---|---|---|---|
| 2,595,833 | 5/1952 | Flaherty | 55/DIG. 6 X |
| 3,109,619 | 11/1963 | Krug et al. | 248/206.5 X |
| 3,713,614 | 1/1973 | Taylor | 248/206.5 X |
| 3,912,473 | 10/1975 | Wilkins | 55/DIG. 6 X |
| 4,689,058 | 8/1987 | Vogt et al. | 55/511 X |

FOREIGN PATENT DOCUMENTS 103543  1/1964  Norway .................. 55/DIG. 6

Primary Examiner—Harold Joyce
Attorney, Agent, or Firm—Armstrong & Kubovcik

[57] ABSTRACT

A method of attaching a sheet filter to an inlet opening by covering the inlet opening with a wide sheet filter and fixing the periphery of said sheet filter to the periphery of said inlet opening by use of magnet holders or other fixing means so as to enable a replacement of only the filter which has become dirty by the use.

2 Claims, 2 Drawing Sheets

METHOD OF ATTACHING SHEET FILTER TO INLET OPENING OF VENTILATION FAN OR RANGE HOOD

BACKGROUND OF THE INVENTION

The present invention relates to a method of attaching a sheet filter to the inlet opening (a discharging hole viewing from the room to be ventilated) of a ventialtion fan or a range hood.

Since a ventilation fan or a range hood sucks steam, dust, and oily substance, etc. from its ambient atmosphere and, as a result, it gets extremely dirty and makes itself very difficult to clean, there has been a practice to attach a filtering device (generally called a ventilation fan cover or a range hood cover) having with a filter made of nonwoven fabric at the inlet opening of said ventilation fan or said range hood so as to catch the oily substance, steam, etc. which are included in the air sucked by said filtering device.

Such a filtering device, as stated in Japanese Utility Model notification No. 56-18908, Japanese Utility Model laid open No. 52-167660, Japanese Utility Model laid open No. 56-149837, or Japanese Utility Model laid open No. 59-195436, consists of a frame made of synthetic resin or metal, a filter made of nonwoven fabric which covers the above-mentioned inlet opening together with said frame from outside, and means to set temporarily said filter to said frame and, when the filter gets dirty with oil, steam, etc., only the filter is replaced.

However the frame of such a filtering device must be cleaned at proper intervals because it gets dirty with oily smoke, etc. and, moreover, the replacement of said filtering device is troublesome because the filter must be attached to said frame before attaching the filtering device to the inlet opening. Especially in the case of a range hood, it is extremely difficult to manufacture a filtering device according to an individual range hood because there are range hoods of a hundred of sizes and shapes.

Though there in the market are ventilation fan covers consisting of a frame made of press-formed aluminum or vinyl chloride sheet and to which nonwoven fabric or other material is bonded, there has been a problem that such covers bring a high cost because the nonwoven fabric must be disposed together with said frame when they get dirty by use, and there has been a further problem that extremely various kinds of covers must be manufactured to suit with respective ventilation fans and range hoods.

SUMMARY OF THE INVENTION

The present invention has been made in view of the above-mentioned circumstances, and the method of attaching a sheet filter to an inlet opening, relating to the first invention comprises a step of covering said inlet opening having magnetic portion at least on the periphery thereof with a sheet filter which is larger than said inlet opening, and a step of fixing said sheet filter to the magnetic portion by use of magnet holders which are attracted to said magnetic portion.

Here, the magnetic portion includes the periphery of the inlet opening made of an iron plate, etc., and the periphery of an inlet opening to which a magnetic plate made of magnetic substance such as iron is attached with adhesive, screws, etc..

The method of attaching a sheet filter to an inlet opening, relating to the second invention comprises a step of attaching lugs to the periphery of the inlet opening beforehand, a step of covering the inlet opening with a sheet filter which is enough larger than the inlet opening to be covered, and a step of fixing said sheet filter by applying a cap to each of said lugs, with said sheet filter being held.

The method of attaching a sheet filter to an inlet opening, relating to the third invention comprises a step of attaching beforehand the jointing means which joint with nonwoven fabric to the periphery of the inlet opening and a step of preparing nonwoven fabric which is larger than said inlet opening and a step of covering said inlet opening with said nonwoven fabric and fix temporarily the periphery of said nonwoven fabric to the above-mentioned jointing means.

Here the above-mentioned jointing means include a base plate provided with hooked projections and a hook tape.

In addition, it is preferable to use fire-resistant nonwoven fabric as a filter material but the present invention applies to such nonwoven fabric that is provided with core material for reinforcement.

OBJECTS AND ADVANTAGES OF THE INVENTION

The object of the first, second, and third inventions is to provide a method of attaching a sheet filter to an inlet opening at low cost, wherein the sheet filter is easy to attach to the inlet opening and also easy to replace and, moreover, the sheet filter is possible to attach to a range hood or a ventilation fan of any kind regardless of its size.

The present method is very economical because the replacement is completed only by replacing the sheet filter.

Then the explanations hereinbelow will clarify the object and the effect of the present invention.

DESCRIPTION OF THE PREFERRED EMBODIMENT

Figure 1:
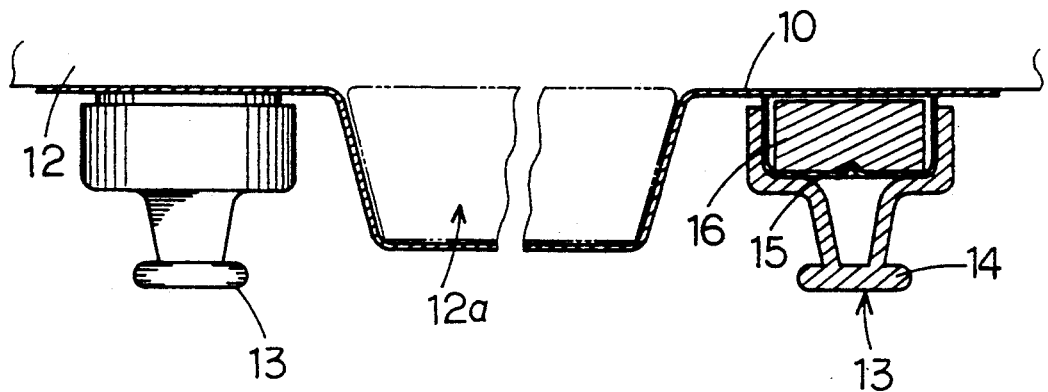
FIG. 1 is a side sectional view showing the method of attaching a sheet filter to an inlet opening, relating to the first example of the embodiment of the present invention.
Figure 2:
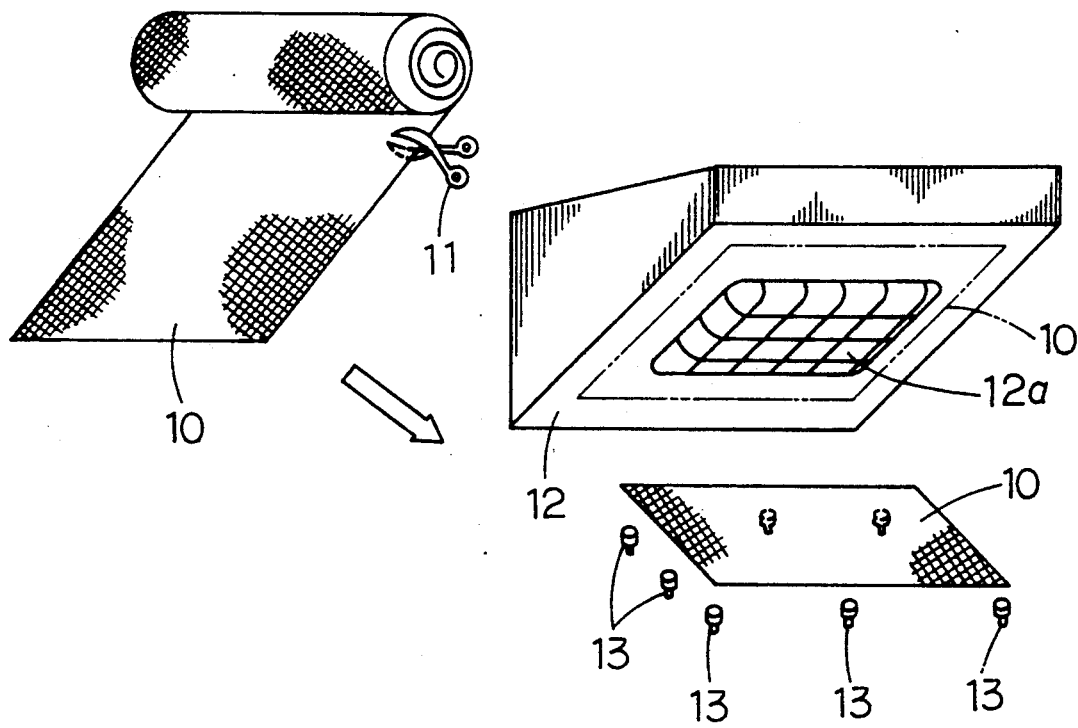
FIG. 2 is a perspective view showing the step of said attaching method.

FIG. 1 and FIG. 2 illustrate an example in which the method of attaching a sheet filter to an inlet opening, relating to the first example of the embodiment of this invention is applied to an iron-made range hood. First, as shown in FIG. 2, the fire-resistant nonwoven fabric 10 which is an example of a sheet filter is cut into a piece of the specified area by the scissors 11, etc., put over the inlet opening 12a of the range hood 12, and then, as shown in FIG. 1, the periphery of the nonwoven fabric 10 is fixed by the proper number of magnet holders 13.

Each of said magnet holders 13, consisting of the grip 14 made of synthetic resin, the iron-made aid metal 15 which is provided at the center of said grip 14, and the strong magnet 16 which is provided at the center of said aid metal 15 with a space, is attracted to the above-mentioned iron-made range hood 12, holding the nonwoven fabric 10 between it and the range hood.

The magnet 16 is bonded with adhesives to the cylindrical aid metal 15 having a bottom, and said aid metal is bonded with adhesives to the grip 14.

Accordingly, because the inlet opening 12a of the iron-made range hood 12 is thus covered with the nonwoven fabric 10, and the periphery of said nonwoven fabric 10 is thus fixed to the range hood 12 by the magnet holders 13, oily smoke is caught by said nonwoven fabric 10, which is replaced easily by removing the magnet holders 13, putting a new nonwoven fabric 10 at the predetermined position, and fixing the periphery of the new nonwoven fabric again by the magnet holders 13.

Figure 3:
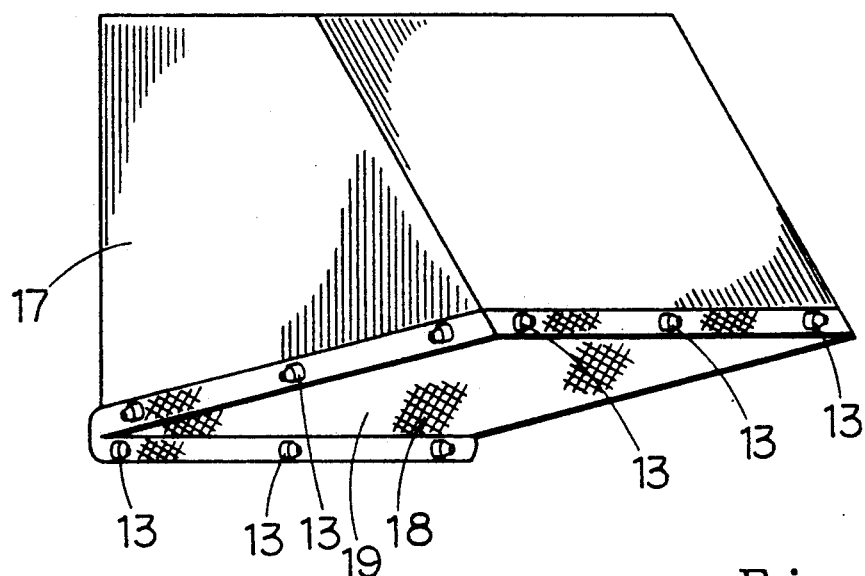
FIG. 3 is a perspective view showing the method of attaching a sheet filter to an inlet opening, relating to the second example of the embodiment of the present invention.

FIG. 3 illustrates an example in which the method of attaching a sheet filter to an inlet opening, relating to the second example of the embodiment of this invention is applied to another range hood 17. As shown in the figure, the nonwoven fabric 18 which is an example of a sheet filter is bent and attached to the periphery of the inlet opening 19, being pressed by the above-mentioned magnet holders 13. In this example of the embodiment, therefore, the nonwoven fabric 18 is replaced easily by removing the magnet holders 13.

Figure 4:
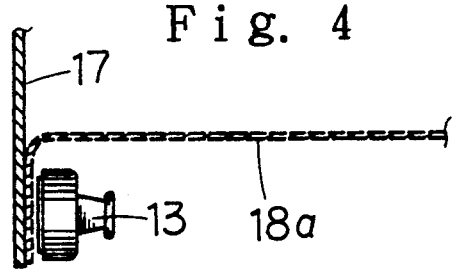
FIG. 4 is a partial sectional view showing the method of attaching a sheet filter to an inlet opening, relating to the third example of the embodiment of the present invention.

FIG. 4 illustrates the method of attaching a sheet filter to an inlet opening, relating to the third example of the embodiment of this invention, wherein the nonwoven fabric 18a which is an example of a sheet filter is put at the inside of above-mentioned range hood 17 and its end portions are bent and fixed to the inside of the iron-made range hood 17 by the magnet holders 13. Thus the inside of the inlet opening of range hood 17 is covered by the nonwoven fabric 18a and, accordingly, oily smoke, etc. are caught by this nonwoven fabric 18a.

Figure 5:
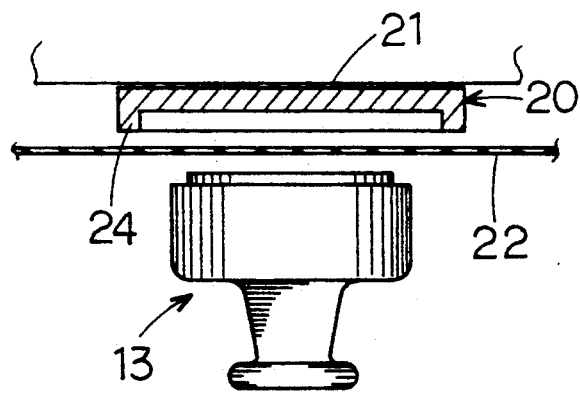
FIG. 5 is a side sectional view showing the method of attaching a sheet filter to an inlet opening, relating to the fourth example of the embodiment of the present invention.

FIG. 5 illustrates the method of attaching a sheet filter to an inlet opening, relating to the fourth example of the embodiment of this invention. In this case, because the magnet holders 13 are not attracted to the inlet opening if it is not made of iron, the magnetic plate 20 is bonded with adhesives 21, etc. to the periphery of the inlet opening beforehand, and then the nonwoven fabric 22 which is an example of a sheet filter is put over the inlet opening and attached to it by the magnet holders 13. Further, on the periphery of above-mentioned magnetic plate 20, the projecting edge frame 24 is provided so that the magnet holders 13 may not move. This projecting edge frame 24 is very effective especially in case of a vertical installation.

Figure 6:
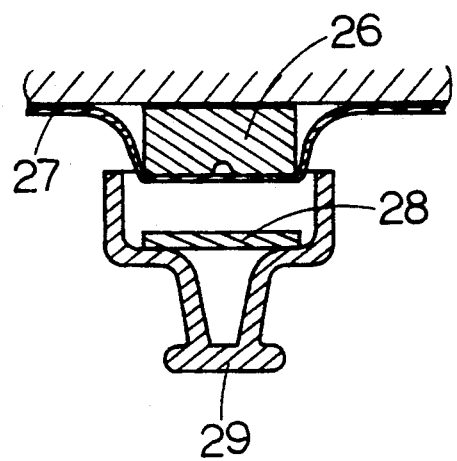
FIG. 6 is a side sectional view showing the method of attaching a sheet filter to an inlet opening, relating to the fifth example of the embodiment of the present invention.

FIG. 6 illustrates the method of attaching a sheet filter to an inlet opening, relating to the fifth example of the embodiment of this invention. As shown in the figure, the magnets 26 which are composed of lugs are attached to the periphery of an iron-made inlet opening with a proper distance the nonwoven fabric 27 which is an example of a sheet filter is put over the inlet opening, and then the caps 29 whose inside are attached with the iron plate 28 are put on the magnets 26 so as to fix the nonwoven fabric 27.

Thus the nonwoven fabric 27 can be fixed tightly to the periphery of the inlet opening by the caps 29 and becomes easy to replace because the replacement is made only by pulling out the caps 29. Further, in this example of the embodiment, it is possible to attach the magnets which are composed of lugs to the periphery of the inlet opening by use of screws, etc. and, this method is very effective if the periphery of the inlet opening is made of non-magnetic material.

Figure 7:
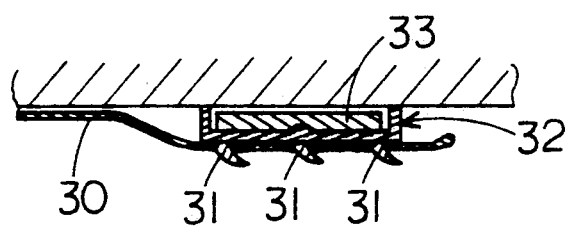
FIG. 7 is a sectional view showing the method of attaching a sheet filter to an inlet opening, relating to the sixth example of the embodiment of the present invention.

FIG. 7 illustrates the method of attaching a sheet filter to an inlet opening, relating to the sixth example of the embodiment of this invention. Here, as a sheet filter, the nonwoven fabric 30 is used and, as shown in the figure, plural number of bases 32 to each of which hooked projections 31 each of which is an example of a jointing means are attached by the magnet 33 to the periphery of an inlet opening with proper distance that the periphery of said nonwoven fabric 30 may be caught by said hooked projection 31. By this method, the attaching and removing of the nonwoven fabric 30 becomes extremely easy.

Though the plural number of bases having the hooked projections as a jointing means in this example of embodiment, it is also possible to employ a hook tape, which is bonded with adhesives, etc. to the periphery of the inlet opening so that the nonwoven fabric may easily be attached or detached by means of the hooked projections of said hook tape.

What is claimed is:

1. A method of attaching a sheet filter to an inlet opening of a range hood or a ventilation fan having a magnetic portion at least on the periphery thereof, comprising the steps of;
    covering said inlet opening and the magnetic portion of the periphery with a fire-resistant unwoven cloth which is larger than said inlet opening, and
    fixing said unwoven cloth to said magnetic portion by attaching a plurality of magnet holders, each of which are magnetically attached to said magnetic portion over said unwoven cloth.

2. A method of attaching a sheet filter to an inlet opening according to the claim (1), wherein said magnetic portion is a magnetic plate whose periphery is provided with a projecting edge frame.

* * * * *